United States Patent [19]

Hsu et al.

[11] Patent Number: 5,284,927

[45] Date of Patent: * Feb. 8, 1994

[54] PROCESS FOR PREPARING A RUBBERY TERPOLYMER OF STYRENE, ISOPRENE AND BUTADIENE

[75] Inventors: Wen-Liang Hsu, Copley; Adel F. Halasa, Bath, both of Ohio

[73] Assignee: The Goodyear Tire & Rubber Company, Akron, Ohio

[*] Notice: The portion of the term of this patent subsequent to Aug. 11, 2009 has been disclaimed.

[21] Appl. No.: 922,414

[22] Filed: Jul. 31, 1992

Related U.S. Application Data

[63] Continuation-in-part of Ser. No. 787,490, Nov. 4, 1991, Pat. No. 5,137,998, which is a continuation-in-part of Ser. No. 601,102, Oct. 22, 1990, abandoned.

[51] Int. Cl.$^5$ .................. C08F 4/48; C08F 236/10
[52] U.S. Cl. ............................. 526/174; 526/173; 526/175; 526/179; 526/180; 526/337
[58] Field of Search .............. 526/173, 174, 175, 179, 526/180, 337

[56] References Cited

U.S. PATENT DOCUMENTS

| | | | |
|---|---|---|---|
| 3,924,768 | 12/1966 | Wofford | 526/173 X |
| 4,537,939 | 8/1985 | Hall et al. | 526/179 |
| 5,137,998 | 8/1992 | Hsu et al. | 526/174 |

FOREIGN PATENT DOCUMENTS 0098977  1/1984  European Pat. Off. ............ 526/179

*Primary Examiner*—Fred Teskin
*Attorney, Agent, or Firm*—Alvin T. Rockhill

[57] ABSTRACT

The subject invention relates to a technique for synthesizing rubbery terpolymers of styrene, isoprene and butadiene. These rubbery terpolymers exhibit an excellent combination of properties for utilization in tire tread rubber compounds. By utilizing such terpolymers in tire treads, tires having improved wet skid resistance can be built without sacrificing rolling resistance or tread wear characteristics. The subject invention specifically discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) tripiperidino phosphine oxide, (b) an alkali metal alkoxide and (c) an organolithium compound.

18 Claims, No Drawings

PROCESS FOR PREPARING A RUBBERY TERPOLYMER OF STYRENE, ISOPRENE AND BUTADIENE

This is a continuation-in-part of application Ser. No. 07/787,490, filed on Nov. 4, 1991, now issued as U.S. Pat. No. 5,137,998, which is a continuation-in-part Application of application Ser. No. 07/601,102, filed on Oct. 22, 1990 (now abandoned).

BACKGROUND OF THE INVENTION

It is highly desirable for tires to have good wet skid resistance, low rolling resistance, and good wear characteristics. It has traditionally been very difficult to improve a tire's rolling resistance without sacrificing its wet skid resistance and traction characteristics. These properties depend to a great extent on the dynamic viscoelastic properties of the rubbers utilized in making the tire.

In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about $-110°$ C. to $-20°$ C. and exhibit a second glass transition temperature which is within the range of about $-50°$ C. to $0°$ C. According to U.S. Pat. No. 4,843,120 these polymers are made by polymerizing at least one conjugated diolefin monomer in a first reaction zone at a temperature and under conditions sufficient to produce a first polymeric segment having a glass transition temperature which is between $-110°$ C. and $-20°$ C. and subsequently continuing said polymerization in a second reaction zone at a temperature and under conditions sufficient to produce a second polymeric segment having a glass transition temperature which is between $-20°$ C. and $20°$ C. Such polymerizations are normally catalyzed with an organolithium catalyst and are normally carried out in an inert organic solvent.

SUMMARY OF THE INVENTION

It has been unexpectedly found that terpolymers of styrene, isoprene and butadiene which exhibit multiple-viscoelastic responses result from terpolymerizations of styrene, isoprene and butadiene in the presence of (a) tripiperidino phosphine oxide, (b) an alkali metal alkoxide, and (c) an organolithium compound. By utilizing this technique, such terpolymers which exhibit multiple glass transition temperatures can be prepared in a single reaction zone. The SIBR (styrene-isoprene-butadiene rubber) made by the technique of this invention offers an outstanding combination of properties for utilization in making tire tread rubber compounds. Utilizing SIBR prepared by the technique of this invention in tire tread results in improved wet skid resistance without sacrificing rolling resistance or tread wear characteristics.

Utilizing the technique of this invention, SIBR which exhibits multiple viscoelastic response can be easily prepared on a commercial basis in a single reaction zone. In other words, this invention eliminates the need for utilization of two or more polymerization reactors for preparing SIBR which exhibits multiple glass transition temperatures.

The subject invention more specifically discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about $40°$ C. in the presence of (a) tripiperidino phosphine oxide, (b) an alkali metal alkoxide, and (c) an organolithium compound.

DETAILED DESCRIPTION OF THE INVENTION

This invention relates to a technique for preparing SIBR which is comprised of repeat units which are derived from styrene, isoprene, and 1,3-butadiene. The monomer charge composition utilized in the synthesis of the SIBR will typically contain from about 5 weight percent to about 35 weight percent styrene, from about 20 weight percent to about 75 weight percent isoprene, and from about 20 weight percent to about 75 weight percent 1,3-butadiene. It is normally preferred for the SIBR to contain from about 5 weight percent to about 30 weight percent styrene, from about 30 weight percent to about 60 weight percent isoprene, and from about 30 weight percent to about 60 weight percent butadiene. It is generally most preferred for the monomer charge composition to contain from about 10 weight percent to about 25 weight percent styrene, from about 35 weight percent to about 45 weight percent isoprene, and from about 35 weight percent to about 45 weight percent butadiene. Since the polymerizations of this invention are normally carried out to completion, the ratio of monomers in the charge composition will be equivalent to the bound ratio of monomers in the SIBR terpolymer.

The polymerizations of the present invention will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer, styrene monomer and isoprene monomer. In most cases, it will be preferred for the polymerization medium to contain from 10 to 30 weight percent monomers. It is generally more preferred for the polymerization medium to contain 20 to 25 weight percent monomer.

Polymerization is started by adding an organolithium compound and an alkali metal alkoxide or tripiperidino phosphine oxide to the polymerization medium. Such polymerizations can be carried out utilizing batch, semi-continuous, or continuous techniques. In a continuous process additional monomer, catalyst, and solvent are continuously added to the reaction vessel being utilized. The polymerization temperature utilized will typically be within the range of about −10° C. to about 40° C. It is normally preferred for the polymerization medium to be maintained at a temperature which is within the range of about 0° C. to about 30° C. throughout the polymerization. It is typically most preferred for the polymerization temperature to be within the range of about 10° C. to about 20° C. The pressure used will normally be sufficient to maintain a substantially liquid phase under the conditions of the polymerization reaction.

The polymerization is conducted for a length of time sufficient to permit substantially complete polymerization of monomers into SIBR. In other words, the polymerization is normally carried out until high conversions are realized. The polymerization can then be terminated using a standard procedure.

The organolithium compound which can be utilized includes organomonolithium compounds and organo multifunctional lithium compounds. The organo multifunctional lithium compounds will typically be organodilithium compounds or organotrilithium compounds. Some representative examples of suitable multi-functional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio, 1,2-diphenylethane, 1,3,5,-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4′-dilithiobiphenyl, and the like.

The organolithium compounds which can be utilized are normally organomonolithium compounds. The organolithium compounds which are preferred can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The alkali metal in the alkali metal alkoxide can be potassium, rubidium or cesium. It is typically preferred for the alkali metal to be potassium. The alkali metal alkoxide will typically contain from about 2 to about 12 carbon atoms. It is generally preferred for the alkali metal alkoxide to contain from about 3 to about 8 carbon atoms. It is generally most preferred for the alkali metal alkoxide to contain from about 4 to about 6 carbon atoms. Potassium t-amyloxide (potassium t-pentoxide) is a highly preferred alkali metal alkoxide which can be utilized in the catalyst systems of this invention. In most cases it is preferred for the member selected from the group consisting of tripiperidino phosphine oxide and alkali metal alkoxides to be tripiperidino phosphine oxide.

In the catalyst systems of this invention, the total of the molar ratio of the tripiperidino phosphine oxide to the organolithium compound and the molar ratio of the alkali metal alkoxide to the organolithium compound will typically be within the range of about 0.1:1 to about 6:1. It is generally preferred for the total of the molar ratio of the alkali metal alkoxide to the organolithium compound and the molar ratio of the tripiperidino phosphine oxide to the organolithium compound to be within the range of about 0.4:1 to about 2:1. Molar ratios within the range of about 0.8:1 to about 3:2 are most preferred. This molar ratio would be 1:1 in cases where 0.5 mole of the tripiperidino phosphine oxide, 0.5 mole of the alkali metal alkoxide, and 1 mole of the organolithium compound are utilized. Any molar ratio of tripiperidino phosphine oxide to alkali metal alkoxide can be employed. However, the molar ratio of tripiperidino phosphine oxide to alkali metal alkoxide will typically be within the range of 1000:1 to 1:1000. The molar ratio of the tripiperidino phosphine oxide to the alkali metal alkoxide will more typically be within the range of 100:1 to 1:100.

The amount of catalyst employed will be dependent upon the molecular weight which is desired for the SIBR being synthesized. As a general rule with all anionic polymerizations, the molecular weight of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

SIBR made by the process of this invention has multiple glass transition temperatures. It exhibits a first glass transition temperature which is between about −110° C. and about −20° C. It has also exhibits a second glass transition temperature which is between −50° C. and 0° C. In many cases the SIBR also exhibits a third glass transition temperature which is within the range of about −20° C. to 20° C. In most cases the SIBR to have a first glass transition temperature which is within the range of −40° C. to −20° C. and a second glass transition temperature which is within the range of −25° C. to −5° C. The glass transition temperatures referred to herein are as determined by differential scanning calorimetry using a Dupont thermal analyzer with a heating rate of 50° C. per minute and sample size of 8 mg.

The multiple glass transition temperatures of the SIBR is attributable to polymeric segments within the SIBR which have different microstructures and different monomeric ratios. It has been determined that in the polymerizations of this invention that styrene is the most reactive monomer with butadiene being somewhat less reactive and with isoprene being much less reactive. This means that the initial polymer segments formed are rich in styrene and butadiene with relatively few repeat units in the initial segments being derived from isoprene. However, toward the end of the polymerization, the supply of styrene monomer is essentially exhausted and polymer segments containing repeat units which are derived almost entirely from butadiene and isoprene result. Because isoprene has the lowest relative rate of reactivity, the final polymer segments formed will be relatively rich in isoprene repeat units. In the area between the two ends of the polymer chains, there is normally a transition zone. Such a transition zone has a microstructure and a monomer content which is intermediate to the two polymeric segments at opposite ends of the SIBR polymer. In effect, the microstructure and monomeric make-up of the polymer in this transition zone is tapered.

It is normally advantageous to utilize the SIBR of this invention in blends with other rubbers in making tire tread compounds. Tire treads of this type will normally be comprised of about 30 weight percent to about 80 weight percent of the SIBR, based upon the total amount of rubber in the blend. Such blends will preferably contain from about 50 weight percent to about 70 weight percent of the SIBR. For instance, the SIBR of this invention can be blended with natural rubber or synthetic polyisoprene in order to make tread compounds for passenger tires which exhibit outstanding rolling resistance, traction, and tread wear characteristics. Such blends will normally be comprised of about 50 weight percent to about 70 weight percent of the SIBR and from about 30 weight percent to about 50 weight percent of the natural rubber or synthetic isoprene. High performance tires which exhibit very exceptional traction characteristics, but somewhat comprised tread wear and rolling resistance, can be prepared by blending from about 50 weight percent to about 70 weight percent of the SIBR with from about 30 percent to about 50 percent of a standard solution or emulsion styrene-butadiene rubber (SBR). In cases where tread wear is of greater importance than traction, such as heavy truck tires, high cis-1,4-polybutadiene or high trans-1,4-polybutadiene can be substituted for the emulsion or solution SBR. Tire treads made utilizing such a rubber blend containing high cis-1,4-polybutadiene and/or high trans-1,4-polybutadiene exhibits very outstanding tread wear and rolling resistance while maintaining satisfactory traction characteristics.

This invention is illustrated by the following examples which are merely for the purpose of illustration and are not to be regarded as limiting the scope of the invention or the manner in which it can be practiced. Unless specifically indicated otherwise, all parts and percentages are given by weight.

COMPARATIVE EXAMPLE 1

SIBR having only one glass transition temperature was synthesized in this experiment. A monomer solution containing 20 weight percent styrene, 40 weight percent 1,3-butadiene, and 40 weight percent isoprene was dried in a column packed with silica, alumina, a molecular sieve and sodium hydroxide. The monomer solution which contained 18.4 weight percent monomers in hexane was charged into a one gallon (3.8 liter) reactor. Then, 3.07 ml of a potassium p-amylate solution (0.68M in hexane) and 2 ml of n-butyllithium (1.04M in hexane) was charged into the reactor. The reactor was maintained at a temperature of 50° C. with agitation being applied. Small quantities of the reaction mixture were taken from the reactor periodically to analyze the residual monomers and determine their polymerization rates. When the polymerization was completed (after about 7-8 hours), 2 ml of methyl alcohol was added to shortstop the polymerization. Then, 1 phr (parts per hundred parts of rubber) of an antioxidant was added to the SIBR cement. The hexane solvent was then evaporated with the SIBR recovered being dried in a vacuum oven overnight at 50° C. It was determined that the SIBR contained 18% bound styrene, 16% bound 1,2-butadiene, 24% bound 1,4-butadiene units, 18% 3,4-polyisoprene units, 24% bound 1,4-polyisoprene units and 2% 1,2-isoprene units. DSC showed that the SIBR had a single glass transition temperature at −53° C. The SIBR synthesized had only one glass transition temperature because the polymerization was conducted at a temperature of 50° C. The polymerization temperature utilized in the synthesis of SIBR having two glass transition temperatures will be maintained at less than 40° C. and preferably less than 30° C.

COMPARATIVE EXAMPLE 2

In this experiment SIBR having two glass transition temperatures was synthesized utilizing the techniques described in U.S. Pat. No. 5,137,998. In the procedure used a monomer solution containing 10% styrene, 45% isoprene, and 45% butadiene was dried in a column packed with silica, alumina, a molecular sieve and sodium hydroxide. Then, 2870 g of the monomer solution which contained 17.6% monomers in hexane was charged into a one gallon (3.8 liter) reactor. Polymerization was initiated by charging 11.4 ml of a 3.3M solution of tripiperidino phosphine oxide (TPPO) in hexane and 1.8 ml of a 1.1M solution of n-butyl lithium in hexane into the reactor. The molar ratio of TPPO to n-butyl lithium was 2:1. The temperature in the reactor was maintained within the range of 10° C. to 14° C.

Small samples were taken out of the reactor periodically during the polymerization to monitor the level of residual monomers. Such samples showed that the styrene and 1,3-butadiene polymerized very fast. In fact, essentially all of the styrene and butadiene polymerized within 30 minutes. However, the isoprene continued to polymerize for 5 more hours at which time the polymerization was shortstopped by the addition of methanol. Then, 1 phr of an antioxidant was added to the SIBR cement.

The hexane solvent was evaporated with the SIBR recovered being dried in a vacuum oven overnight at 50° C. It was determined that the SIBR contained 32% 1,2-polybutadiene units, 16% 1,4-polybutadiene units, 32% 3,4-polyisoprene units, 7% 1,4-polyisoprene units, 3% 1,2-polyisoprene units, and 10% polystyrene units. DSC showed that the SIBR had a first glass transition temperature at −21° C. and a second glass transition temperature at −8° C.

COMPARATIVE EXAMPLE 3

The procedure described in Comparative Example 2 was utilized in this experiment except that the polymerization was maintained at higher temperature within the range of 24° C. to 34° C. The SIBR produced was determined to have a first glass transition temperature at −32° C. and a second glass transition temperature at −22° C. It was also determined to have a microstructure which contained 27% 1,2-polybutadiene units, 21% 1,4-polybutadiene units, 32% 3,4-polyisoprene units, 9% 1,4-polyisoprene units, 1% 1,2-polyisoprene units, and 10% polystyrene units.

COMPARATIVE EXAMPLE 4

The procedure described in Comparative Example 3 was utilized in this experiment except that the molar ratio of TPPO to n-butyl lithium was increased to 3:1. The SIBR produced was determined to have a first glass transition temperature at −25° C. and a second glass transition temperature at −11° C. The SIBR was also determined to contain 29% 1,2-polybutadiene units, 18% 1,4-polybutadiene units, 34% 3,4-polyisoprene units, 7% 1,4-polyisoprene units, 2% 1,2-polyisoprene units, and 10% polystyrene units.

COMPARATIVE EXAMPLE 5

The procedure described in Comparative Example 4 was utilized in this experiment except that the polymerization was maintained at a temperature within the range of 40° C. to 70° C. The SIBR produced had only one glass transition temperature which was at −32° C.

EXAMPLE 6

In this experiment SIBR having two glass transition temperatures was synthesized utilizing the techniques of this invention. In the procedure used, a monomer solution containing 10% styrene, 45% isoprene, and 45% butadiene was dried in a column packed with silica, alumina, molecular sieve and sodium hydroxide. Then, 2290 grams of the monomer solution which contained 19.5% monomers in hexane was charged into a one gallon (3.8 liter) reactor. Polymerization was initiated by charging 6.7 ml of a 0.32M solution of tripiperidinophosphine oxide (TPPO) in hexane, 5.1 ml of a 0.14M solution of potassium amylate (KOAm) in hexane and 2.2 ml of a 0.74M solution of n-butyl lithium in hexane into the reactor. The molar ratio of TPPO to KOAm was 3:1 and the molar ratio of the combined TPPO and KOAm to n-butyl lithium was 2:1. The temperature in the reactor was maintained within the range of 10° C. to 12° C.

Small samples were taken out of the reactor periodically during the polymerization to monitor the level of residual monomers. Such samples showed that the styrene and 1,3-butadiene polymerized much faster than isoprene. In fact, essentially all of the styrene and butadiene polymerized within 2 hours. However, the isoprene continued to polymerize for 7 more hours at which time the polymerization was shortstopped by the addition of methanol. Then, 1 phr of an antioxidant was added to the SIBR cement.

The hexane solvent was evaporated with the SIBR recovered being dried in a vacuum oven overnight at 50° C. It was determined that the SIBR contained 25% 1,2-polybutadiene units, 20% 1,4-polybutadiene units, 27% 3,4-polyisoprene units, 12% 1,4-polyisoprene units, 6% 1,2-polyisoprene units, and 10% polystyrene units. DSC showed that the SIBR had a first glass transition temperature at −40° C. and a second glass transition temperature at −26° C.

EXAMPLE 7

The procedure utilized in Example 6 was utilized in this experiment except that the molar ratio of TPPO to KOAm was reduced to 2:1. The molar ratio of the combined TPPO and KOAm to n-butyl lithium remained the same (2:1). The SIBR produced was determined to have a first glass transition temperature at −44° C. and a second transition temperature at −25° C. It was also determined to have a microstructure which contained 23% 1,2-polybutadiene units, 22% 1,4-polybutadiene units, 25% 3,4-polyisoprene units, 14% 1,4-polyisoprene units, 6% 1,2-polyisoprene units, and 10% polystyrene units.

EXAMPLE 8

The procedure described in Example 6 was utilized in this experiment except that the molar ratio of TPPO to KOAm was reduced to 1:1. The molar ratio of the combined TPPO and KOAm to n-butyl lithium remained the same (2:1). The SIBR produced was determined to have a first glass transition temperature at −48° C. and a second transition temperature at −30° C. It was also determined to have a microstructure which contained 20% 1,2-polybutadiene units, 25% 1,4-polybutadiene units, 21% 3,4-polyisoprene units, 17% 1,4-polyisoprene units, 7% 1,2-polyisoprene units, and 10% polystyrene units.

Variations in the present invention are possible in light of the description of it provided herein. It is, therefore, to be understood that changes can be made in the particular embodiments described which will be in the full intended scope of the invention as defined by the following appended claims.

What is claimed is:

1. A process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) tripiperidino phosphine oxide, (b) an alkali metal alkoxide, and (c) an organolithium compound.

2. A process as specified in claim 1 wherein the organolithium compound is an organomonolithium compound.

3. A process as specified in claim 1 wherein the organolithium compound is an alkyllithium compound having the formula:

$$R-Li$$

wherein R represents and alkyl group containing from 1 to 10 carbon atoms.

4. A process as specified in claim 1 wherein the molar ratio of the tripiperidino phosphine oxide to the alkali metal alkoxide is within the range of 1000:1 to 1:1000.

5. A process as specified in claim 4 wherein the alkali metal alkoxide is potassium t-amyloxide.

6. A process as specified in claim 1 wherein a monomer charge containing from about 5 weight percent to about 35 weight percent styrene, from about 20 weight percent to about 75 weight percent isoprene, and from about 20 weight percent to about 75 weight percent 1,3-butadiene, based upon total monomers, is utilized.

7. A process as specified in claim 1 wherein the terpolymerization is carried out at a temperature which is within the range of about −10° C. to about 40° C.

8. A process as specified in claim 4 wherein the total of the molar ratio of the alkali metal alkoxide to the organolithium compound and the molar ratio of the tripiperidino phosphine oxide to the organolithium compound is within the range of about 0.1:1 to about 6:1.

9. A process as specified in claim 8 wherein said terpolymerization is carried out at a temperature which is within the range of about 0° C. to about 30° C.

10. A process as specified in claim 9 wherein the organolithium compound is an organomonolithium compound.

11. A process as specified in claim 10 wherein the total of the molar ratio of the alkali metal alkoxide to the organolithium compound and the molar ratio of the tripiperidino phosphine oxide to the organolithium compound is within the range of about 0.4:1 to about 2:1.

12. A process as specified in claim 11 wherein a monomer charge containing from about 5 weight percent to about 30 weight percent styrene, from about 30 weight percent to about 60 weight percent isoprene, and from about 30 weight percent to about 60 weight percent 1,3-butadiene, based upon total monomers, is utilized.

13. A process as specified in claim 12 wherein the organic solvent contains from about 5 weight percent to about 35 weight percent monomers.

14. A process as specified in claim 13 wherein from about 0.01 phm to about 1 phm of the organolithium compound is present.

15. A process as specified in claim 2 wherein the terpolymerization is carried out at a temperature which is within the range of about 10° C. to about 20° C.

16. A process as specified in claim 14 wherein the alkali metal alkoxide is potassium p-amyloxide.

17. A process as specified in claim 6 wherein the terpolymerization is carried out at a temperature which is within the range of about −10° C. to about 40° C.

18. A process as specified in claim 4 wherein the organolithium compound is an organomonolithium compound; wherein the organic solvent contains from about 5 to about 35 weight percent monomers; and wherein the monomer charge composition contains from about 5 weight percent to about 35 weight percent styrene, from about 20 weight percent to about 75 weight percent isoprene, and from about 20 weight percent to about 75 weight percent 1,3-butadiene.

* * * * *